W. Joslin.

Cordage Mach.

No. 1,048. Reissued Sept. 25, 1860.

Witnesses;

E. B. Bassett

Inventor;

Wm Joslin

UNITED STATES PATENT OFFICE.

WILLIAM JOSLIN, OF CLEVELAND, OHIO.

IMPROVEMENT IN MACHINERY FOR MANUFACTURING CORDAGE.

Specification forming part of Letters Patent No. 4,931, dated January 19, 1847; Reissue No. 1,048, dated September 25, 1860.

*To all whom it may concern:*

Be it known that I, WILLIAM JOSLIN, of Cleveland, in the State of Ohio, have invented certain new and useful Improvements in Machinery for Manufacturing Cordage; and I do hereby declare that the following is a full, clear, and exact description thereof, reference being had to the accompanying drawings, making part of this specification, in which—

Figure 1:
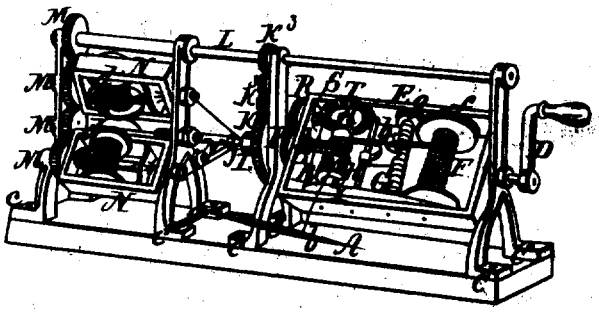
Figure 2:
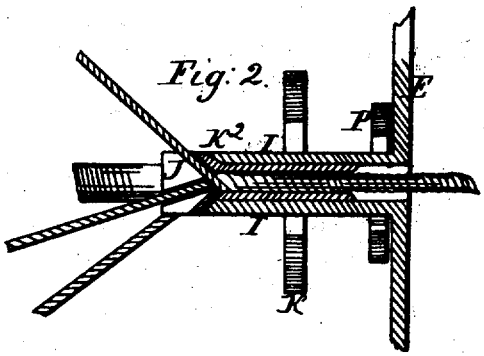
Figure 3:
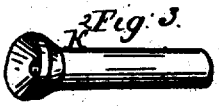

Figure 1 is a perspective view of a machine on my improved plan; Fig. 2, a longitudinal section of the laying-block and condensing-tube, and Fig. 3 a perspective view of the condensing-tube.

The same letters indicate like parts in all the figures.

The object of my said invention is to lay rope or cordage in such manner that it shall be smooth and even and with the strands under equal tension and twist, and at the same time obtain these results expeditiously, with the view to economy in the manufacture.

In the accompanying drawings, A represents a base-plate, on which are mounted four standards, *c c c c*, which constitute the frame of the machine. The spools carrying the strands are mounted in three fliers, N N N, with their spindles at right angles to the axes of the fliers. The fliers are all rotated in the same direction and with equal velocity by a train of cog-wheels, M M M M, the first being on a horizontal shaft, L, receiving motion in manner to be presently described. By this rotation of the fliers N the fore twist is put into the strands as they pass to the laying-part of the machine. Each spool is provided with a spring and friction block, *d*, to make friction, and thereby keep the strands under proper tension during the operation of putting in the fore twist. Each strand is delivered through the hollow nose of its flier, and the three are brought together within a condensing-tube, $K^2$, where they are laid into a rope of the required size. The bore of this condensing-tube must be of a diameter equal to the intended diameter of the rope to be laid, and so as to make a gentle pressure upon the outer surface of all the strands. The receiving end of this tube is enlarged of a conical shape, and in front thereof is placed the laying-block J, of a corresponding form, so that the three strands shall be laid together between the laying-block and enlarged bore of the condensing-tube, and hence the three strands must be laid together evenly and smoothly to insure an even and smooth rope. The condensing-tube is represented as being placed within the hollow nose I of a large flier, E, through which the laid rope is drawn, and in which it receives the required twist. The large flier is mounted so as to be turned at the required velocity, and in the accompanying drawings a crank-handle, D, is represented on the outer journal of this flier as a means of imparting motion to the entire mechanism. The hollow nose of this flier carries a cog-wheel, K, the rotation of which imparts motion by a train of cog-wheels, $K^3$, to the before-described shaft L to drive the three strand-fliers N N N, by which the fore twist is given to the strands. The hollow nose of the large flier E passes through and turns in a stationary cog-wheel, P, from which motion is given to a cog-wheel, R, the arbor of which is mounted in the end of the flier, so as to be carried planet-like around the stationary wheel P. The arbor of the wheel R carries inside the fliers a bevel-pinion, S, which drives a bevel-wheel, T, on one end of the capstan H, mounted in the flier at right angles with its axis of rotation. On the shaft of this capstan H is mounted a conical sleeve-drum, B, which may be adjusted longitudinally thereon relatively to a guide, B′, and secured in place by a screw, *b*.

The laid rope passes from the hollow nose of the flier on one side of the guide B′, and passes around the conical drum, thence to the other side of the guide B′, and around the conical drum to the spool F, and as the conical drum turns with its shaft, which always makes a positive number of revolutions relatively to the flier E, it follows that by shifting the conical drum so as to have a greater or a less diameter next to the guide B′, more or less rope will be drawn through for a given number of revolutions of the flier, and thereby vary the amount of twist.

The capstan carries a pulley at the end opposite the bevel cog-wheel, which pulley carries an elastic belt, X, to impart motion to the arbor of a spool, F, also mounted in the larger flier, for the purpose of winding up the rope as it is delivered by the capstan. The pulleys around which the belt X passes are so proportioned as to insure sufficient motion to wind the rope with the smallest diameter of spool. As the diameter is increased by the winding on of the rope, the belt slips on the pulleys, so that the rope is always wound up under tension.

The arbor of the spool F carries a cog-wheel, *f*, which engages a cog-wheel, *g*, on a parallel arbor, G, also mounted in the large flier, the surface of which is threaded from right to left and from left to right, to impart motion alternately to the right and left to a guide, *h*, through which the rope passes on the way to the spool to guide and lay it thereon smoothly.

Having described the mode of operation of my said invention and of the mode of application thereof, I wish it to be understood that I do not limit my claim of invention to such mode of application, as it may be greatly varied without changing the principle or mode of operation invented by me.

I do not wish to be understood as making claim, broadly, to the use of a condensing-tube, as I am aware that such a device, or the equivalent thereof, has been employed in machinery for making and twisting strands to be made afterward into ropes; but the mode of operation of such machines was not adapted to nor could it be applied to the laying of rope or other cordage.

What I do claim as my invention, and desire to secure by Letters Patent in machinery for laying rope, is—

1. The employment of a condensing-tube and laying-block, or other equivalents thereof, in combination with the means of giving the fore twist to the strands and the twist to the laid rope, substantially as described, or the equivalents thereof, for the purpose specified.

2. The series of fliers turning in stationary bearings to give the fore turn or twist to the strands, as described, in combination with the flier for giving the twist to the rope, and provided with a cross-capstan and means of giving tension to the rope, substantially as described.

WM. JOSLIN.

Witnesses:
E. B. BARNUM,
WM. H. BISHOP.